(12) United States Patent
Lee et al.

(10) Patent No.: US 9,853,513 B2
(45) Date of Patent: Dec. 26, 2017

(54) INSULATION COVER OF RESOLVER AND METHOD FOR WINDING COIL OF INSULATION COVER OF RESOLVER

(71) Applicant: DAESUNG ELECTRIC CO., LTD., Ansan-si (KR)

(72) Inventors: Won Young Lee, Seoul (KR); Byung Cheol Na, Gunpo-si (KR)

(73) Assignee: DAESUNG ELECTRIC CO., LTD., Ansan-si (KR)

( * ) Notice: Subject to any disclaimer, the term of this patent is extended or adjusted under 35 U.S.C. 154(b) by 0 days.

(21) Appl. No.: 15/222,599

(22) Filed: Jul. 28, 2016

(65) Prior Publication Data
US 2016/0336827 A1    Nov. 17, 2016

Related U.S. Application Data

(63) Continuation of application No. PCT/KR2015/009062, filed on Aug. 28, 2015.

(30) Foreign Application Priority Data

Sep. 5, 2014    (KR) .......................... 10-2014-0119241

(51) Int. Cl.
*H02K 3/00*        (2006.01)
*H02K 3/32*        (2006.01)
(Continued)

(52) U.S. Cl.
CPC ................. *H02K 3/32* (2013.01); *H02K 1/14* (2013.01); *H02K 3/46* (2013.01); *H02K 5/08* (2013.01);
(Continued)

(58) Field of Classification Search
CPC .......... H02K 5/08; H02K 5/225; H02K 24/00; H02K 15/08; H02K 2203/12; H02K 3/46;
(Continued)

(56) References Cited

U.S. PATENT DOCUMENTS 4,177,397 A * 12/1979 Lill ...................... H01R 4/2416
                                                174/DIG. 20
5,233,751 A *  8/1993 Luciani .................. H02K 3/522
                                                     242/432.4
(Continued)

FOREIGN PATENT DOCUMENTS

EP            1385256        1/2004
JP         2009-245096 A    10/2009
(Continued)

OTHER PUBLICATIONS

JP 2009268230 A English Translation.*
(Continued)

*Primary Examiner* — Michael Andrews
*Assistant Examiner* — Maged Almawri
(74) *Attorney, Agent, or Firm* — Perkins Coie LLP

(57) ABSTRACT

The present description relates to an insulation cover of a resolver and a method for winding a coil of the insulation cover, which has a slack part formed on a coil by: a slit part formed on a body part so as to correspond to a terminal pin when winding the coil on the terminal pin of a terminal part formed at one side of the insulation cover; and a winding guide part protrudingly formed on a winder so as to correspond to the slit part such that the coil is inserted into or withdrawn from the slit part, relieves the tension, applied to the coil, by the slack part so as to minimize a break in the coil according to the thermal deformation or the deterioration of the coil, has a compact structure, is easily manufactured and reduces manufacturing costs.

10 Claims, 9 Drawing Sheets

(51) Int. Cl.
*H02K 24/00* (2006.01)
*H02K 1/14* (2006.01)
*H02K 3/46* (2006.01)
*H02K 5/08* (2006.01)
*H02K 15/08* (2006.01)

(52) U.S. Cl.
CPC ............. *H02K 15/08* (2013.01); *H02K 24/00* (2013.01); *H02K 2203/12* (2013.01)

(58) Field of Classification Search
CPC .. H02K 3/32; H02K 2203/03; H02K 2203/06; H02K 2203/09; H02K 5/04; H02K 5/02; H02K 5/22; H02K 5/26; H02K 3/30; H02K 3/38; H02K 3/50; H02K 3/52; H02K 1/14; H02K 15/14
USPC ............... 310/71, 194, 68 B, 43, 68 D, 68 R
See application file for complete search history.

(56) References Cited

U.S. PATENT DOCUMENTS

| | | | |
|---|---|---|---|
| 6,044,545 A | 4/2000 | Ohshita | |
| 6,933,636 B2* | 8/2005 | Miya | H02K 3/522 310/40 R |
| 7,159,296 B2* | 1/2007 | Miya | H02K 15/0056 242/432.6 |
| 7,183,952 B1* | 2/2007 | Akutsu | H02K 24/00 341/112 |
| 7,356,910 B2* | 4/2008 | Akutsu | G01D 5/2046 29/602.1 |
| 7,635,933 B2* | 12/2009 | Makino | H02K 3/522 310/68 B |
| 7,755,231 B2* | 7/2010 | Kataoka | G01D 5/2013 29/596 |
| 7,830,051 B2* | 11/2010 | Kataoka | G01D 5/20 310/71 |
| 8,988,067 B2* | 3/2015 | Aihara | H02K 24/00 324/207.25 |
| 2003/0137295 A1* | 7/2003 | Akutsu | G01D 5/2046 324/207.25 |
| 2004/0055148 A1* | 3/2004 | Miya | H02K 15/0056 29/735 |
| 2005/0168216 A1* | 8/2005 | Akutsu | G01D 5/2046 324/207.25 |
| 2005/0280320 A1* | 12/2005 | Utsumi | G01D 5/2046 310/43 |
| 2008/0073987 A1* | 3/2008 | Kataoka | H02K 3/522 310/71 |
| 2008/0122304 A1* | 5/2008 | Makino | H02K 3/522 310/71 |
| 2008/0169713 A1* | 7/2008 | Kataoka | G01D 5/2013 310/71 |
| 2008/0258585 A1* | 10/2008 | Kataoka | H02K 1/24 310/68 B |
| 2009/0134724 A1* | 5/2009 | Ishizeki | H02K 3/522 310/71 |
| 2012/0200202 A1* | 8/2012 | Asai | H02K 11/0031 310/68 B |

FOREIGN PATENT DOCUMENTS

| | | | |
|---|---|---|---|
| JP | 2009-268230 A | | 11/2009 |
| JP | 2009268230 A | * | 11/2009 |
| JP | 2010-175349 A | | 8/2010 |
| JP | 2011232209 | | 11/2011 |
| JP | 2012-010550 A | | 1/2012 |

OTHER PUBLICATIONS ip.com NPL and Patent Search Report dated Sep. 8, 2017.*
Extended European Search Report for European Patent Application No. 15838368.7, dated Aug. 29, 2017 (11 pages).

* cited by examiner

INSULATION COVER OF RESOLVER AND METHOD FOR WINDING COIL OF INSULATION COVER OF RESOLVER

CROSS-REFERENCE TO RELATED APPLICATION

This patent document is a continuation application, under 35 U.S.C. §120, of International Application No. PCT/KR2015/009062 filed Aug. 28, 2015, which further claims the benefit of priority of Korean Patent Application No. 10-2014-0119241, filed on Sep. 5, 2014. The entire content of the above patent applications is incorporated by reference as part of the disclosure of this patent document.

BACKGROUND

Technology Field

Exemplary embodiments described herein relate to an insulation cover of a resolver and a method for winding a coil of the insulation cover of the resolver, and more particularly to an insulation cover of a resolver and a method for winding a coil of the insulation cover of the resolver, which can relieve a tension that is applied to the coil by a slack part, and thus can minimize breaking of the coil according to thermal deformation or deterioration of the coil.

Description of the Related Art

In general, a resolver of a motor is a sensor that measures a rotational angular velocity and a rotation angle of a rotor for the control of the motor. The resolver detects the rotation angle by reading a carrier amplitude ratio of a sine output and a cosine output from voltages that are generated through changing of the rotation angle of the rotor to sine and cosine states.

A stator of the resolver in the related art is provided with a ring-shaped stator core that enables the rotor to be rotated inside the stator and a plurality of teeth parts formed at predetermined intervals on an inside of the stator core.

According to the resolver in the related art, a coil is wound on the teeth parts of the stator in a state where upper and lower surfaces of the stator are covered by an insulation cover to be insulated. The coil, which is wound on the teeth parts of the stator, is also wound on terminal pins to be electrically connected thereto. In this case, the coil, which is wound on the terminal pins, is stretched tight so that the coil receives high tension without being loosened, and due to this, the wound coil may be broken according to thermal deformation of the coil that is caused by temperature change, vibration, impact, or deterioration of the coil.

In addition, since a separate member is additionally installed to relieve the tension that is applied to the coil, the size of the insulation cover of the resolver is increased and the manufacturing cost is also increased.

Further, with the addition of the separate member, work time is increased when the insulation cover is produced and the coil is wound on the terminal pins of a terminal part and therefore productivity is decreased.

SUMMARY

Some embodiments disclosed in the present document provide an insulation cover of a resolver and a method for winding a coil of the insulation cover of the resolver, which can relieve a tension that is applied to the coil using a slack part, minimize breaking of the coil according to thermal deformation or deterioration of the coil, facilitate production thereof with a compact structure, and reduce the manufacturing cost.

Other aspects and advantages of the disclosed technology can be understood by the following description, and become apparent with reference to the embodiments described herein. Also, it is obvious to those skilled in the art to which the document pertains that the aspects and advantages of the present technology can be realized by the means as claimed and combinations thereof.

In accordance with one aspect, an insulation cover of a resolver configured to cover and insulate a stator of the resolver for sensing a rotation angle of a rotor that is rotated inside the stator composed of a stator core and a teeth part includes a main body part; a teeth insulation part formed to be spaced apart from an inner circumferential surface of the main body part; and a terminal part formed on one side of the main body part, wherein the terminal part includes a body part; a terminal pin protrudingly formed on an upper surface of the body part so that a coil is wound thereon; a slit part formed on the body part to correspond to the terminal pin; and a winding guide part protrudingly formed on a winder to be inserted into or withdrawn from the slit part.

A plurality of terminal pins may be formed on a first horizontal line of the body part, a plurality of slit parts may be formed on a second horizontal line of the body part, and the first horizontal line and the second horizontal line are spaced apart from each other for a predetermined distance.

A plurality of terminal pins may be formed in zigzag on the body part, and a plurality of slit parts may be formed in zigzag on the body part to correspond to the terminal pins.

The respective terminal pins may be formed so that left end parts thereof come in contact with a vertical line of the body part, and the respective slit parts may be formed so that left end parts thereof are more inclined rightward against the vertical line than the left end parts of the terminal pins.

The respective terminal pins may be formed so that left end parts thereof come in contact with a vertical line of the body part, and the respective slit parts may be formed so that left end parts thereof come in contact with the vertical line of the body part and a width length of the slit part is longer than a width length of the terminal pin.

The coil that is wound on the terminal pins after passing through right end parts of the winding guide parts that are inserted into the teeth parts and the slit parts may be wound at a predetermined angle in order to form a slack part on the coil.

The angle may be equal to or larger than 90° and equal to or smaller than 180°.

In accordance with another aspect, a method for winding a coil of an insulation cover of a resolver includes inserting a winding guide part into a slit part that is formed on a body part of a terminal part; coupling the resolver that is coupled to an insulation cover to a winder; winding the coil that is wound on a teeth part on a terminal pin through the winding guide part; withdrawing the winding guide part from the slit part; and releasing the resolver from the winder.

The inserting of the winding guide part into the slit part may include inserting the winding guide part into the slit part in a state where a right end part of the slit part comes in contact with a right end part of the winding guide part.

The winding of the coil on the terminal pin may include winding the coil, which is wound on the terminal pin after passing through the right end part of the winding guide part that is inserted into the teeth part and the slit part, at an angle that is equal to or larger than 90° and equal to or smaller than 180° in order to form a slack part on the coil.

The withdrawing of the winding guide part from the slit part may include withdrawing the winding guide part from the slit part in a state where a left end part of the winding guide part comes in contact with a left end part of the slit part.

Using the insulation cover of a resolver and the method for winding a coil of then insulation cover of the resolver, the relatively uniform slack parts are formed on the coil when the coil is wound on the terminal pins through a relatively simple configuration that includes the slit parts formed on the body part of the terminal part formed on one side of the insulation cover and the winding guide parts protrudingly formed on the winder. Through this, breaking of the coil that is caused by the thermal deformation of the coil according to the temperature change, vibration, impact, or deterioration of the coil can be minimized.

Further, using the insulation cover of a resolver and the method for winding a coil of then insulation cover of the resolver, a separate member for relieving the tension that is applied to the coil is not added to the insulation cover or the terminal part. Accordingly, the size of the insulation cover of the resolver can be reduced, and the manufacturing cost can be saved.

Further, using the insulation cover of a resolver and the method for winding a coil of then insulation cover of the resolver, the slack part is formed on the coil through processes in which the coil is wound on the terminal pins in a state where the winding guide parts are inserted into the slit parts in the rightward direction without adding a separate member, and then the winding guide parts are withdrawn from the slit parts in the leftward direction. Through this, the work time for the coil winding work can be minimized, and thus productivity can be improved.

It is to be understood that both the foregoing general description and the following detailed description of the present technology are exemplary and explanatory and are intended to provide further explanation of the invention as claimed.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
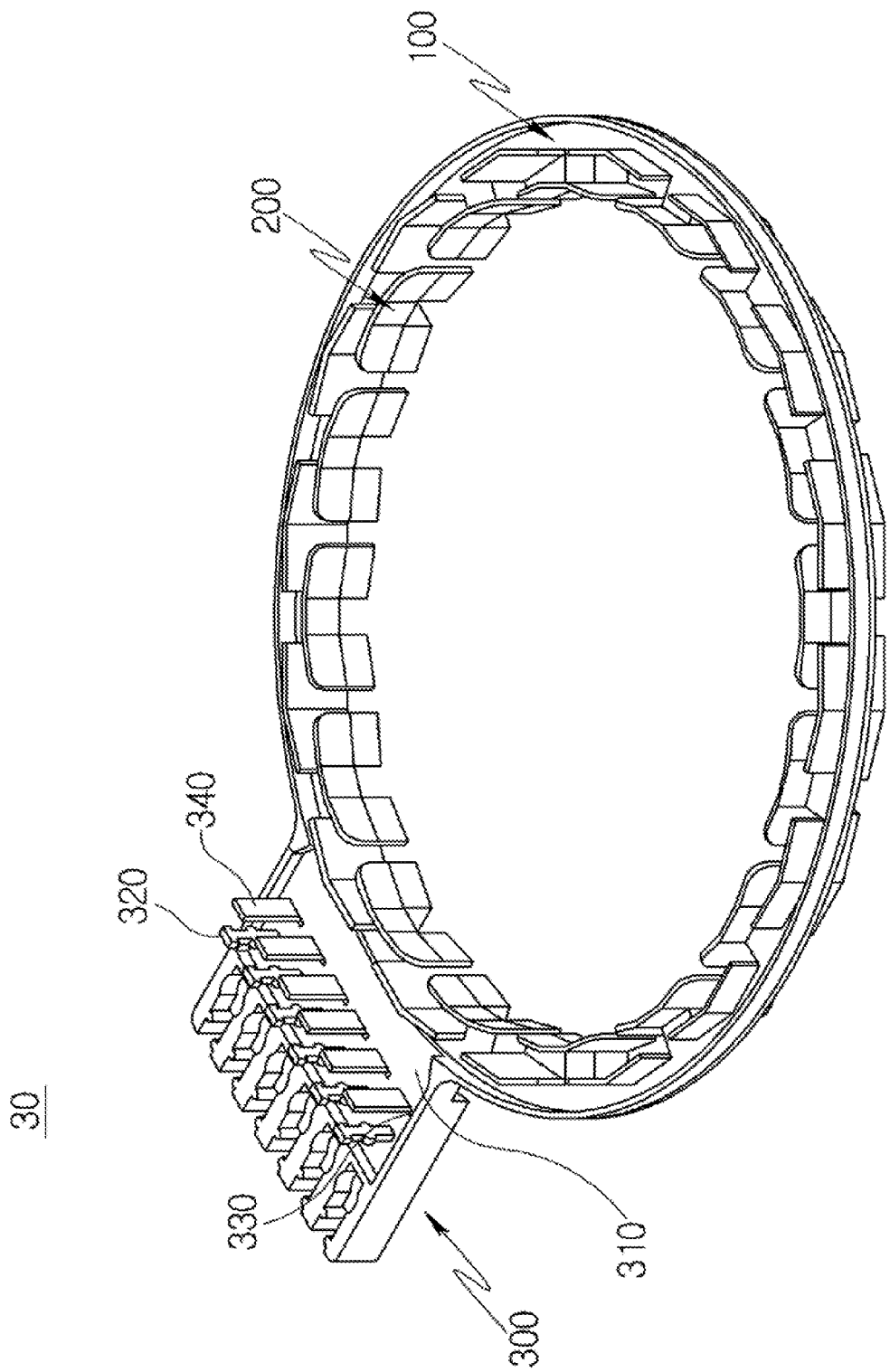
FIG. 1 is a perspective view of an insulation cover of a resolver according to some example embodiments.

Hereinafter, example embodiments will be described in detail with reference to the accompanying drawings so that one of ordinary skill in the art can easily embody the present invention. The disclosed technology may be implemented in various different types, and is not limited to the embodiments described hereinafter.

In the entire description, for easy understanding thereof, portions that are not related to the description will be omitted, and the same drawing reference numerals are used for the same elements across various figures.

In the entire description, the term "connected to" that is used to designate a connection of one element to another element includes both a case that an element is "directly connected to" another element and a case that an element is electrically connected to another element with intervention of any other element. Further, the term "includes" used in the description means existence of one or more other constituent elements, and thus it should be understood that possible existence or addition of one or more other constituent elements is not pre-excluded.

The term "on" that is used to designate that an element is on another element located on a different layer or a layer includes both a case where an element is located directly on another element or a layer and a case where an element is located on another element via another layer or still another element. By contrast, the term "directly on" means that an element is directly on another element or a layer without intervention of any other element or layer.

Although the terms "first, second, third, and so forth" are used to describe diverse elements, components and/or sections, such elements, components and/or sections are not limited by the terms. The terms are used only to discriminate an element, component, or section from other elements, components, or sections. Accordingly, in the following description, a first element, first component, or first section may be a second element, second component, or second section.

In the following description, the terms used are for explaining various embodiments, but do not limit the scope of the disclosed technology. In the description, a singular expression may include a plural expression unless specially described. The term "includes" used in the description means existence of one or more other features, numerals, steps, operations, constituent elements, components, and/or a combination thereof, and thus it should be understood that possible existence or addition of one or more other features, numerals, steps, operations, constituent elements, components, and/or a combination thereof is not pre-excluded.

Spatially relative wordings "below", "beneath", "lower", "above", "upper", and so forth, as illustrated in the drawings, may be used to facilitate the description of relationships between an element or constituent elements and another element or other constituent elements. The spatially relative wordings should be understood as wordings that include different directions of the element in use or operation in addition to the direction illustrated in the drawings. For example, if a device is turned over, some portions that are explained to be below other portions may be explained to be above the other portions. Accordingly, the exemplary wording "below" includes both upper and lower directions. The device may be rotated by 90° or other angles, and in this case, the wording that indicates a relative space may be analyzed accordingly.

Unless differently defined, all terms (including technical and scientific terms) used in the description could be used as meanings commonly understood by those ordinary skilled in the art to which the presently disclosed technology belongs. Terms that are generally used but are not defined in the dictionary are not interpreted ideally or excessively unless they have been clearly and specially defined.

Hereinafter, example embodiments are described in detail with reference to the accompanying drawings so that one of ordinary skill in the art can easily embody the presently disclosed techniques. However, the presently disclosed techniques may be implemented in various different types, and is not limited to the embodiments described hereinafter.

Figure 2:
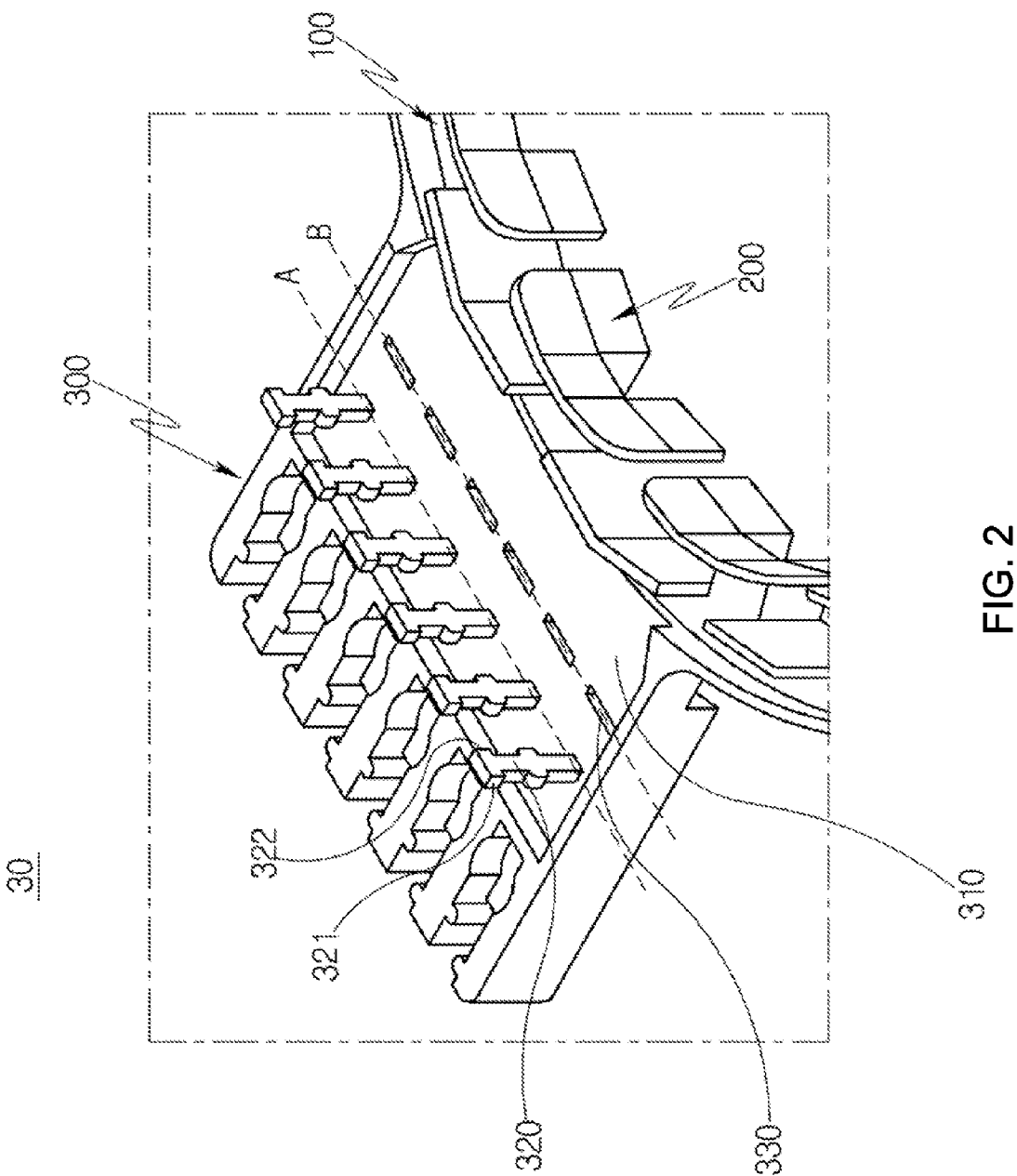
FIG. 2 is a perspective view of an insulation cover of a resolver in a state where winding guide parts are removed from a terminal part according to some example embodiments.
Figure 3:
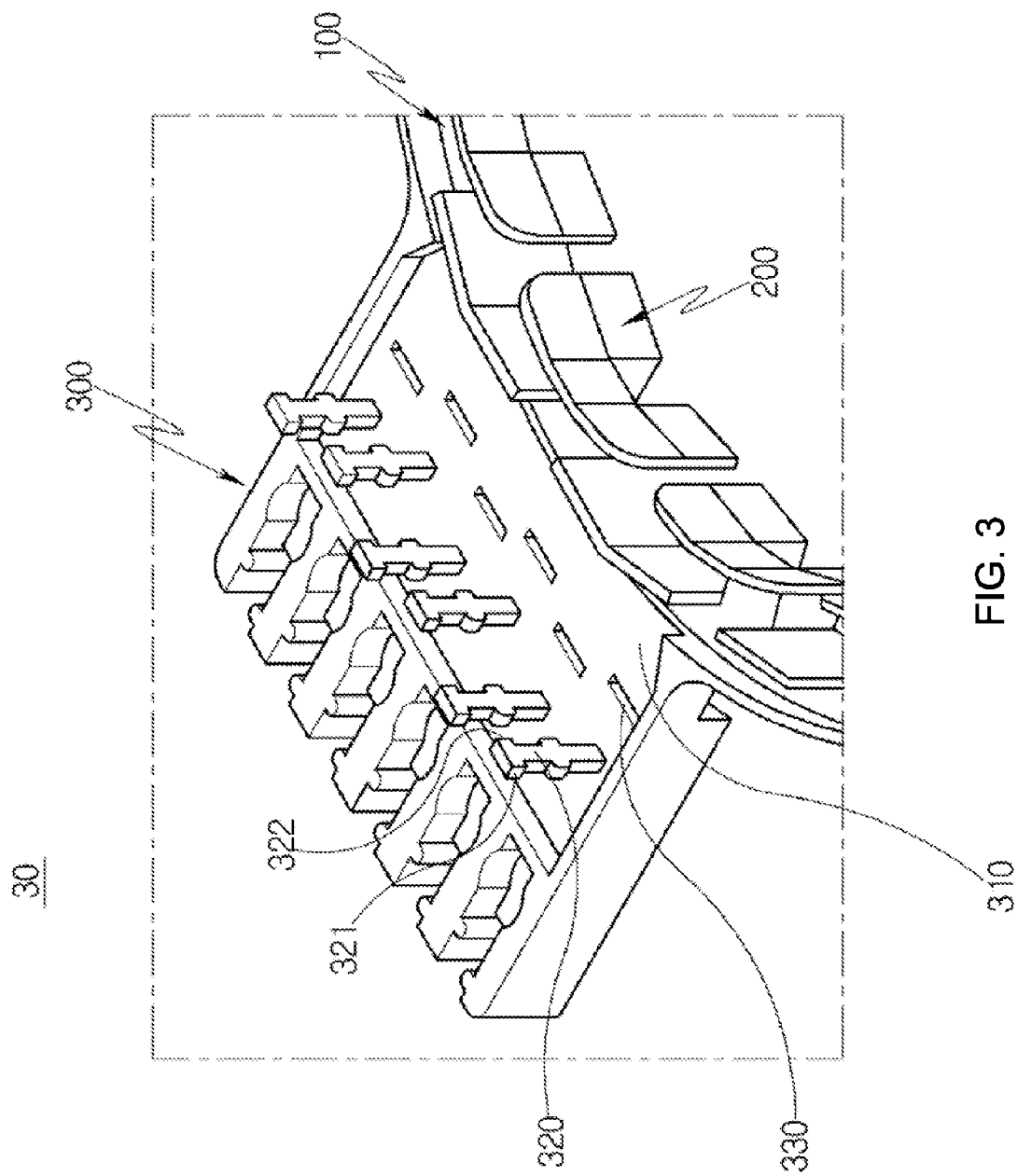
FIG. 3 is a perspective view of an insulation cover of a resolver in a state where winding guide parts are removed from a terminal part according to some example embodiments.
Figure 4:
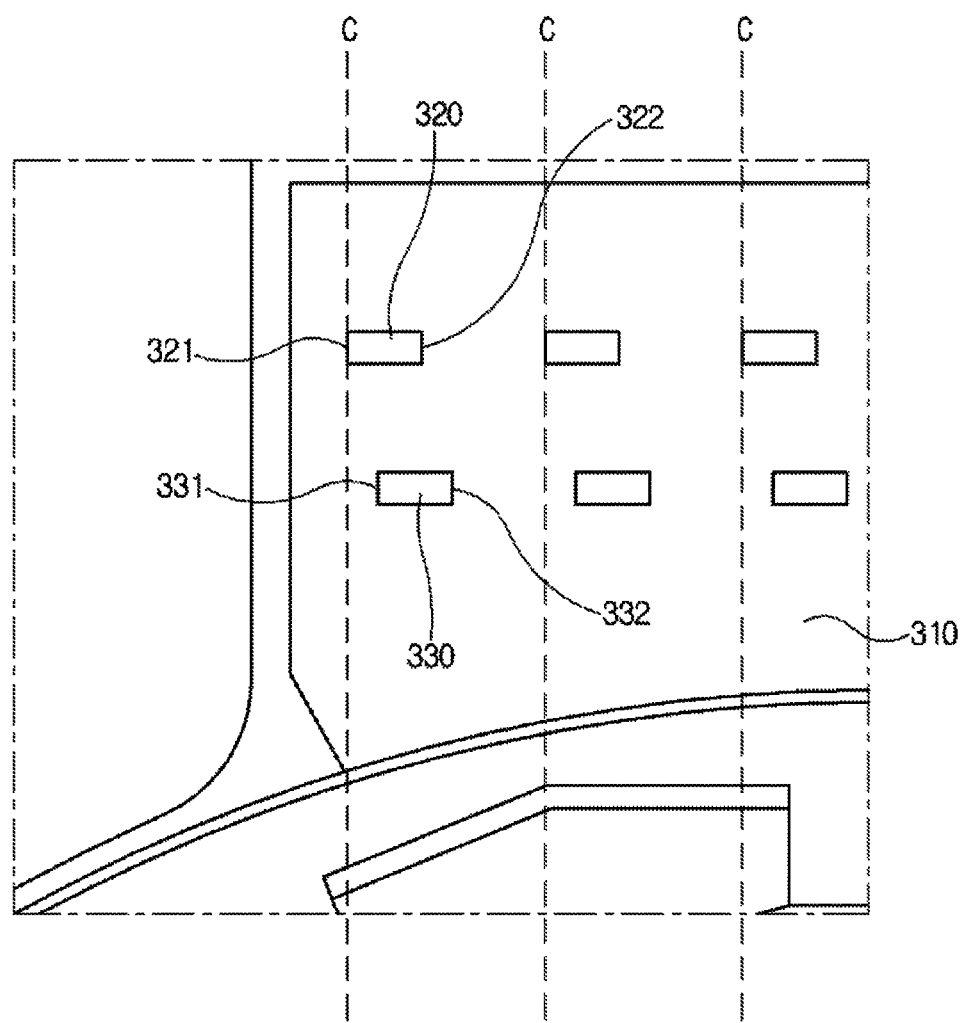
FIG. 4 is a plan view of a terminal part of an insulation cover of a resolver according to some example embodiments.
Figure 5:
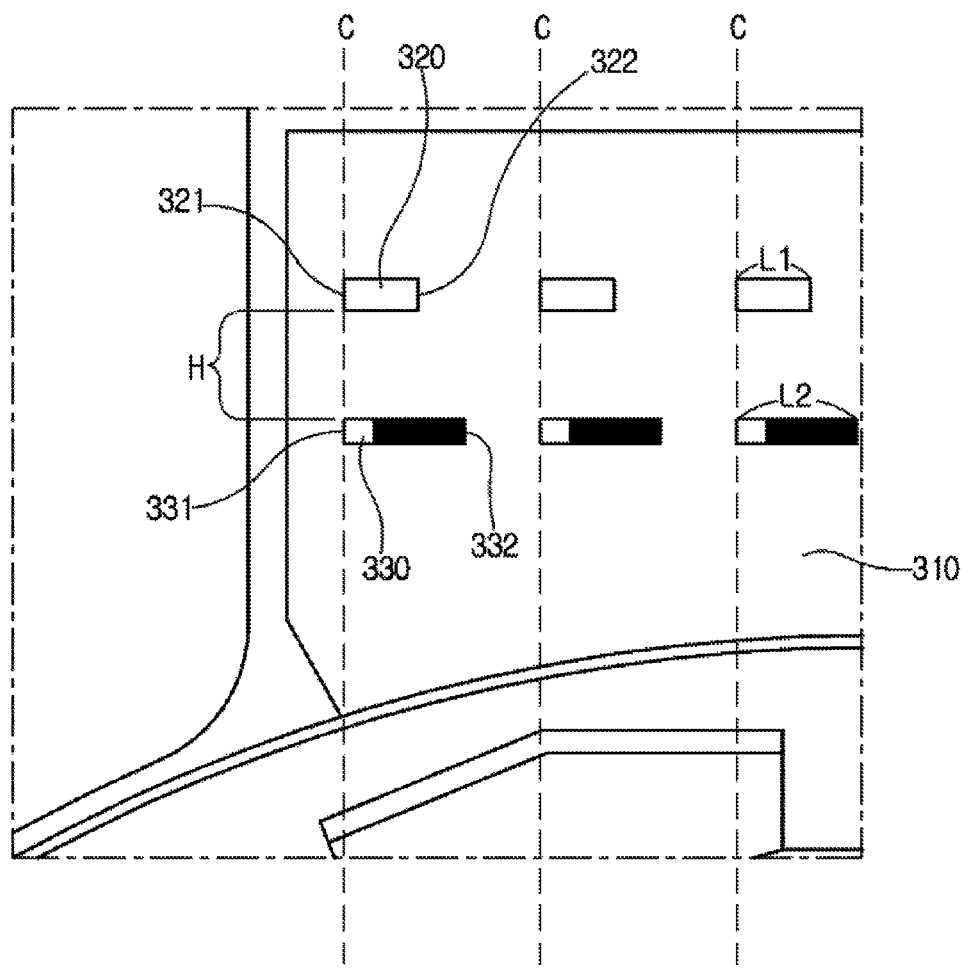
FIG. 5 is a plan view of a terminal part of an insulation cover of a resolver according to another preferred embodiment of the present to some example embodiments.
Figure 6:
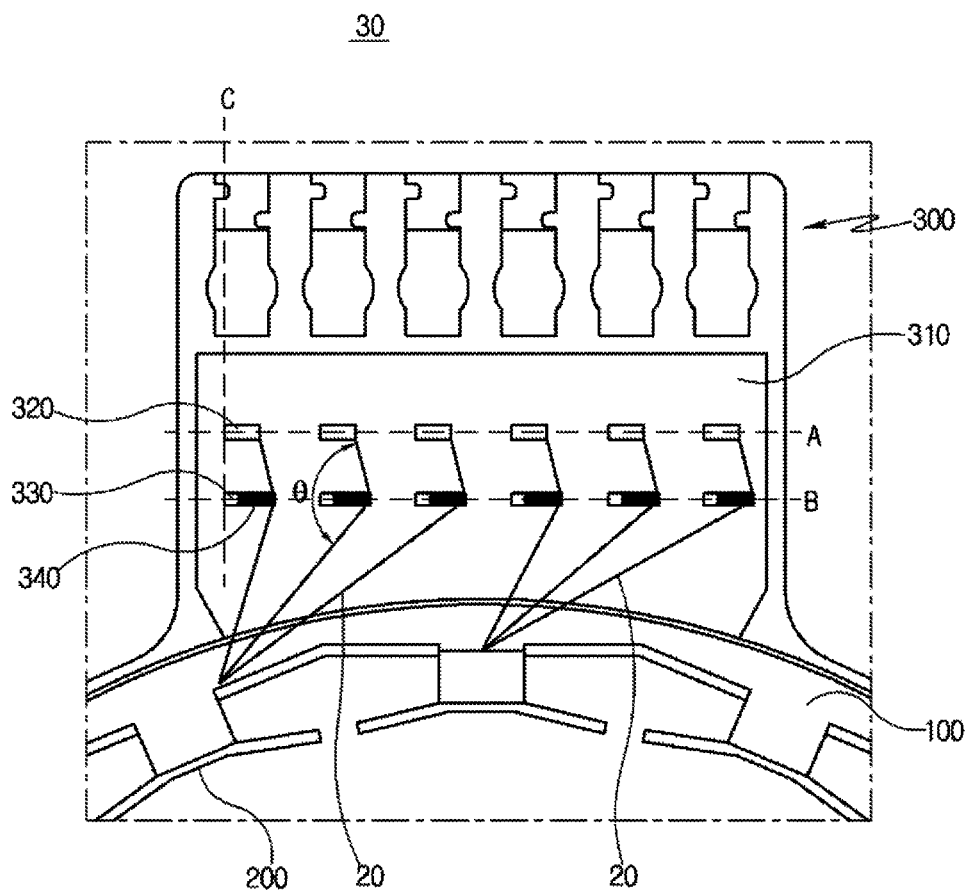
FIG. 6 is a plan view of a terminal part of an insulation cover of a resolver in a state where winding guide parts are inserted into slit parts according to some example embodiments.
Figure 7:
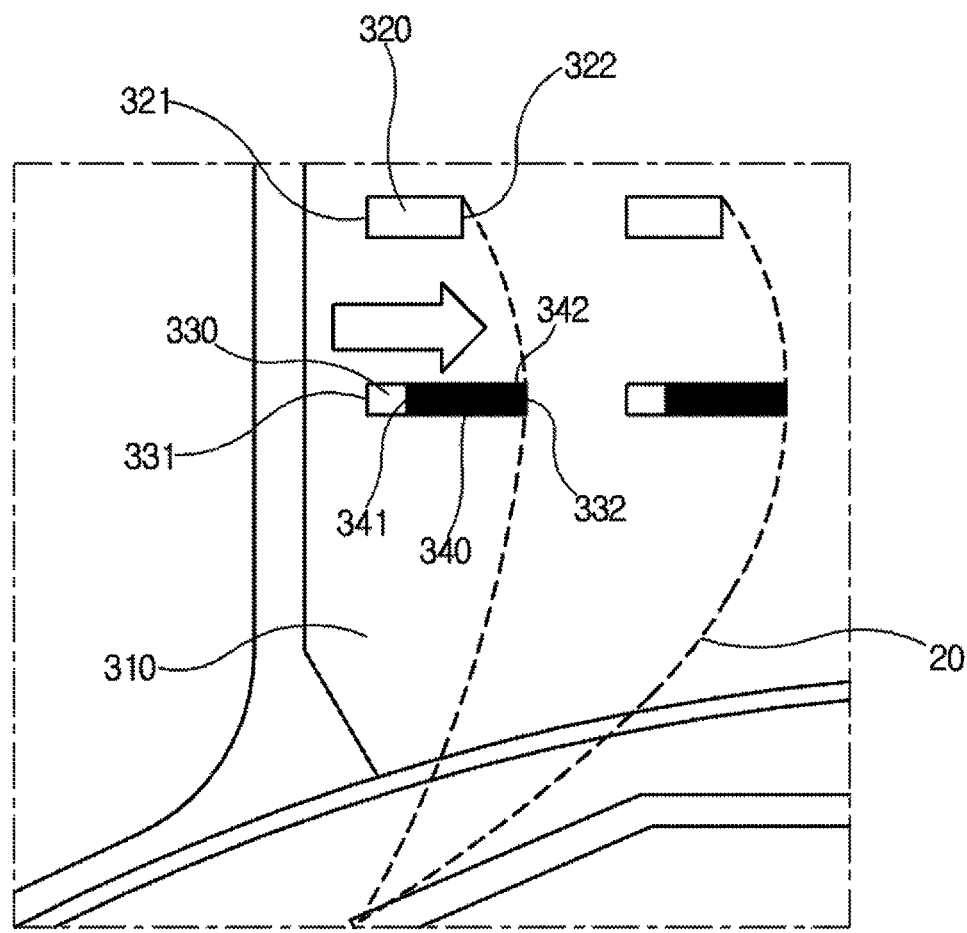
FIG. 7 is a plan view illustrating a state where winding guide parts are inserted into slit parts when a coil is wound on terminal pins according to some example embodiments.
Figure 8:
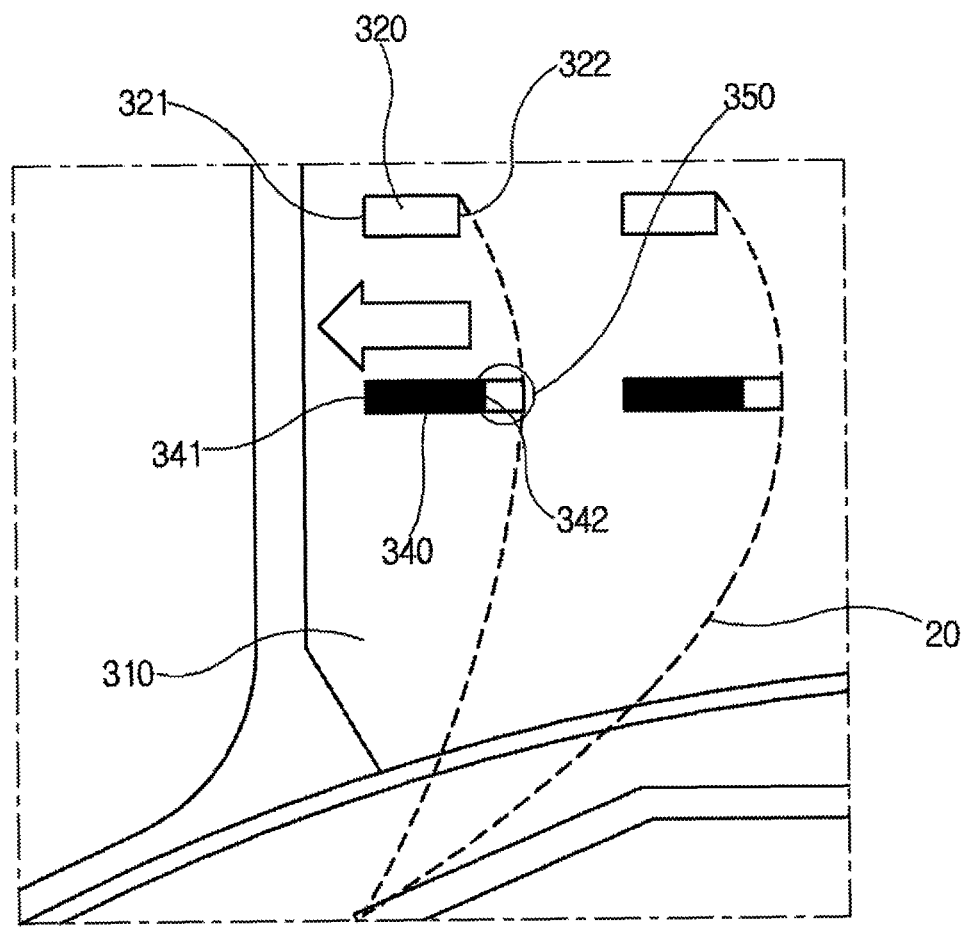
FIG. 8 is a plan view illustrating a state just before winding guide parts are withdrawn from slit parts after a coil is wound on terminal pins according to some example embodiments.

FIG. 1 is a perspective view of an insulation cover of a resolver according to some example embodiments, FIG. 2 is a perspective view of an insulation cover of a resolver in a state where winding guide parts are removed from a terminal part according to some embodiments, and FIG. 3 is a perspective view of an insulation cover of a resolver in a state where winding guide parts are removed from a terminal part according to some example embodiments. FIG. 4 is a plan view of a terminal part of an insulation cover of a resolver according to some example embodiments, FIG. 5 is a plan view of a terminal part of an insulation cover of a resolver according to some example embodiments, and FIG. 6 is a plan view of a terminal part of an insulation cover of a resolver in a state where winding guide parts are inserted into slit parts according to some example embodiments. FIG. 7 is a plan view illustrating a state where winding guide parts are inserted into slit parts when a coil is wound on terminal pins according to some example embodiments, and FIG. 8 is a plan view illustrating a state just before winding guide parts are withdrawn from slit parts after a coil is wound on terminal pins according to some example embodiments.

Referring to FIGS. 1 to 8, an insulation cover 30 of a resolver according to some example embodiments will be described. As illustrated in FIGS. 1 and 2, the insulation cover 30 of a resolver according to some example embodiments includes a main body part 100, a teeth insulation part 200, and a terminal part 300.

A stator is composed of a ring-shaped stator core and a plurality of teeth parts formed at predetermined intervals on an inside of the stator core. The resolver functions to sense a rotation angle of a rotor that is rotated inside the stator.

The main body part 100 of the insulation cover 30 is formed in a ring shape.

A plurality of teeth insulation parts 200 of the insulation cover 30 may be formed to be spaced apart from an inner circumferential surface of the main body part 100. The main body part 100 covers and insulates the stator core, and the teeth insulation parts cover and insulate the teeth parts of the stator.

Preferably, the insulation cover 30 is symmetrically provided on upper and lower surfaces of the stator core and the teeth parts.

The terminal part 300 of the insulation cover 30 is formed on one side of the main body part 100 of the insulation cover to protrude outside of the main body part 100 of the insulation cover. In some example embodiments, the terminal part 300 of the insulation cover is integrally formed with the main body part 100 of the insulation cover.

The terminal part 300 of the insulation cover includes a body part 310, a terminal pin 310, a slit part 330, and a winding guide part 340.

The body part 310 of the terminal part 300 is formed preferably in a rectangular or square shape, and provides a space in which the terminal pin, the slit part, and the winding guide part to be described later can be formed.

The terminal pin 320 of the terminal part 300 is protrudingly formed on an upper surface of the body part 310, and a coil 20 is wound thereon. That is, the coil 20 is wound on the terminal pin 320, and then a lead wire (not illustrated in the drawing) is connected thereto so as to electrically connect the coil 20 to an external device (not illustrated in the drawing), such as a power supply part.

The slit part 330 of the terminal part 300 is formed on the body part 310 to correspond to the terminal pin 320. That is, as illustrated in FIGS. 2 and 4, in some example embodiments, the slit part 330 is penetratingly formed on the body part 310 of the terminal part 300 to be more adjacent to the main body part 100 of the insulation cover than the terminal pin 320.

The winding guide part 340 is protrudingly formed on a winder to be inserted into or withdrawn from the slit part 330. That is, a plurality of winding guide parts 340 are protrudingly formed on the winder (not illustrated in the drawing) to correspond to the number of slit parts 330 formed on the body part 310. Further, it is preferable that the winding guide parts 340 are formed with a size that is smaller than the size of the slit parts 330 so that they can be easily inserted into or withdrawn from the slit parts 330.

As illustrated in FIGS. 2 and 5, a plurality of terminal pins 320 and a plurality of slit parts 330 of the terminal part 300 of the insulation cover 30 of the resolver according to some example embodiments are formed on the body part 310.

That is, a plurality of terminal pins 320 of the insulation cover 30 of the resolver according to some example embodiments are formed on a first horizontal line A of the body part 310, and a plurality of slit parts 330 are formed on a second horizontal line B of the body part 310. The number of slit parts 310 that are formed on the second horizontal line B corresponds to the number of terminal pins 320 that are formed on the first horizontal line A. It is preferable that six terminal pins 320 are formed on the first horizontal line A, and 6 slit parts 330 are formed on the second horizontal line B, but are not limited thereto. If needed, the number of the terminal pins 320 or the slit parts 330 may be smaller than 6 or may be larger than 6.

The first horizontal line A and the second horizontal line B are formed to be spaced apart from each other for a predetermined distance. That is, the plurality of terminal pins 320 that are formed on the first horizontal line A and the plurality of slit parts 330 that are formed on the second horizontal line B should be spaced apart from each other for a distance H enough to prevent interference between the terminal pins and the winding guide parts from occurring when the coil is wound on the terminal pins 320 in a state where the winding guide parts 340 are inserted into the slit parts 330.

As illustrated in FIG. 3, the plurality of terminal pins 320 of the insulation cover 30 of the resolver according to some example embodiments are formed in zigzag shape on the body part 310. Further, the plurality of slit parts 330 of the insulation cover 30 of the resolver are formed in zigzag shape on the body part 310 to be spaced apart from the terminal pins for a predetermined distance to correspond to the zigzag shape of the terminal pins. Since the terminal pins and the slit parts are formed in zigzag on the body part to correspond to each other, the width length (horizontal length) of the terminal part is minimized to reduce the size of the insulation cover, and thus manufacturing of the compact resolver is finally facilitated.

As illustrated in FIGS. 2 and 4, the respective terminal pins 320 of the insulation cover 30 of the resolver according to some example embodiments are formed so that left end parts 321 of the terminal pins come in contact with a vertical line C of the body part 310. Further, the respective slit parts 330 are formed so that left end parts 331 of the slit parts are more inclined rightward against the vertical line C than the left end parts 321 of the terminal pins. That is, the plurality of slit parts 330 are formed so that the number of the terminal pins 320 that are formed on the first horizontal line A of the body part 330 becomes equal to the number of the terminal pins 320 that are formed on the second horizontal line B of the body part 310. The left end parts 321 of the slit parts are formed to be always inclined rightward as compared with the left end parts 321 of the terminal pins on the horizontal line C of the body part 310. As described above, if the winding guide parts are withdrawn from the slit parts after the coil is wound on the terminal pins, the tension that is applied to the coil is relieved due to the positions in which the terminal pins 320 and the slit parts 330 are formed.

As illustrated in FIGS. 2 and 5, the respective terminal pins 320 of the insulation cover 30 of the resolver according to some example embodiments are formed so that the left end parts 321 of the terminal pins come in contact with the vertical line C of the body part 310. Further, the respective slit parts 330 are formed so that the left end parts 331 of the slit parts come in contact with the vertical line C of the body part 310, and the width length L2 of the slit parts 330 is longer than the width length L1 of the terminal pins 320. As described above, if the winding guide parts are withdrawn from the slit parts after the coil is wound on the terminal pins, the tension that is applied to the coil is relieved due to the positions in which the terminal pins 320 and the slit parts 330 are formed.

As illustrated in FIGS. 2 and 6 to 8, the coil 20 that is wound on the terminal pins 320 after passing through the right end parts 342 of the winding guide parts 340 that are inserted into the teeth parts and the slit parts 330 is wound at a predetermined angle in order to form a slack part 350 on the coil 20.

Preferably, in order to form the slack part 350, the coil is wound on the right end parts of the terminal pins after passing through the teeth parts and the right end parts of the winding guide parts so that a predetermined angle θ that is formed between the coil that is wound on the right end parts 322 of the terminal pins and the right end parts 342 of the winding guide parts and the coil that is wound on the right end parts 342 of the winding guide parts and the teeth parts becomes equal to or larger than 90° and equal to or smaller than 180°. If the winding angle θ is smaller than 90° or exceeds 180°, the slack part 350 is not formed on the coil 20 even after the winding guide parts 340 are withdrawn from the slit parts 330 after the coil is wound on the terminal pins 320. Accordingly, the tension is not relieved, and thus breaking of the coil according to thermal deformation or deterioration of the coil may occur. Further, the slack part that is formed on an output line and an input line that are wound on the plurality of terminal pins may become nonuniform.

Referring to FIGS. 7 and 8, a process of winding a coil on an insulation cover of a resolver according to some example embodiments will be described.

The slit parts 330 are formed on the second horizontal line B of the body part 320 of the terminal part to correspond to the number of terminal pins 320 that are formed on the first horizontal line A of the body part 310. The winding guide parts 340, which are protrudingly formed on the winder with a size that is smaller than the size of the slit parts 330 to correspond to the number of slits 330, are inserted into the right side of the slit parts 330. That is, the winding guide parts 340 are inserted into the slit parts 330 in a state where the right end parts 342 of the winding guide parts come in contact with the right end parts 332 of the slit parts.

In this state, the coil is wound on the terminal pins after passing through the teeth parts and the right end parts 342 of the winding guide parts. Although not necessarily limited thereto, the coil that is wound on three terminal pins formed on the left side of the body part 310 of the terminal part of the insulation cover is an output line coil, and the coil that is wound on three terminal pins formed on the right side of the body part 310 is an input line coil.

After the coil 20 is wound on the terminal pins 320, the winding guide parts 340 are withdrawn from the slit parts 320. That is, the winding guide parts 340 are withdrawn from the slit parts 330 in a state where the winding guide parts 340 move to the left side on the slit parts 330 so that the left end parts 341 of the winding guide parts come in contact with the left end parts 331 of the slit parts. If the winding guide parts are withdrawn from the slit parts as described above, the slack part is formed on the coil to relieve the tension that is applied to the coil.

According to the insulation cover of the resolver according to some example embodiments as described above, in the case of winding the coil on the terminal pins of the terminal part that is formed on one side of the insulation cover, the coil is wound on the terminal pins by the slit parts that are formed on the body part to correspond to the terminal pins and the winding guide parts that are protrudingly formed on the winder to correspond to the slit parts so that the winding guide parts are inserted into or withdrawn from the slit parts. Thereafter, if the winding guide parts are released, the slack part is formed on the coil. Through the slack part as described above, the tension that is applied to the coil is relieved, and thus the breaking of the coil according to the thermal deformation or the deterioration of the coil is minimized. Further, due to the compact structure of the insulation cover, the production thereof is facilitated, and the manufacturing cost can be reduced.

Figure 9:
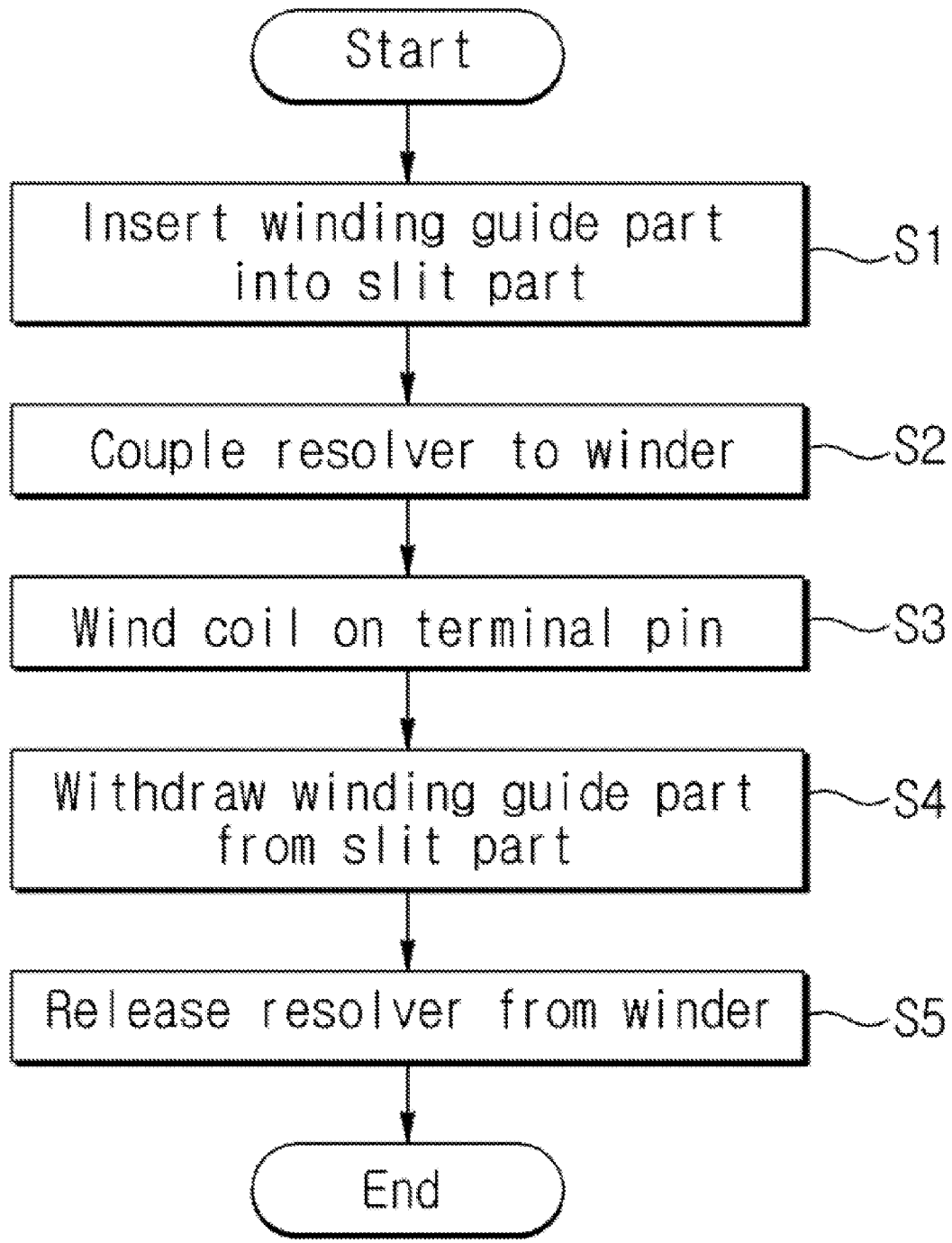
FIG. 9 is a flowchart illustrating a method for winding a coil of an insulation cover of a resolver according to some example embodiments.

FIG. 9 is a flowchart illustrating a method for winding a coil of an insulation cover of a resolver according to some example embodiments. As illustrated in FIG. 9, a method for winding a coil of an insulation cover of a resolver includes inserting a winding guide part into a slit part (S1), coupling the resolver that is coupled to the insulation cover to a winder (S2), winding the coil on a terminal pin (S3), withdrawing the winding guide part from the slit part (S5), and releasing the resolver from the winder (S5).

A plurality of winding guide parts 340 that are protrudingly formed on the winder to correspond to a plurality of slit parts 330 are inserted into the slit parts 330 that are formed on a second horizontal line B of the body part 310 to correspond to a plurality of terminal pins 320 that are formed on a first horizontal line A of the body part 310.

As illustrated in FIG. 7, according to the method for winding a coil of an insulation cover of a resolver according to some example embodiments, the inserting of the winding guide part into the slit part (S1) includes inserting the winding guide part 340 into the slit part 330 in a state where the right end part 332 of the slit part comes in contact with the right end part 342 of the winding guide part.

After the inserting of the winding guide part into the slit part (S1), the resolver that is coupled to the insulation cover is coupled to the winder.

After the coupling of the resolver coupled to the insulation cover to the winder (S2), the coil that is wound on the teeth part is wound on the terminal pin after passing through the wire guide.

As illustrated in FIGS. 7 and 8, according to the method for winding a coil of an insulation cover of a resolver according to some example embodiments, the winding of the coil on the terminal pin (S3) includes winding the coil, which is wound on the terminal pin after passing through the right end part 342 of the winding guide part that is inserted into the teeth part and the slit part to form the slack part on the coil 20, at an angle that is equal to or larger than 90° and equal to or smaller than 180°.

After the winding of the coil on the terminal pin (S3), the winding guide parts 340 that are protrudingly formed on the winder to correspond to the plurality of slit parts 330 are withdrawn from the slit parts 330 that are formed on the second horizontal line B of the body part 310 to correspond to the plurality of terminal pins 320 that are formed on the first horizontal line A of the body part 310.

As illustrated in FIG. 8, according to the method for winding a coil of an insulation cover of a resolver according to some example embodiments, the withdrawing of the winding guide part from the slit part includes withdrawing the winding guide part 340 from the slit part 330 in a state where the left end part 341 of the winding guide part comes in contact with the left end part 331 of the slit part. That is, the coil 20 is wound on the terminal pin 320 in a state where the winding guide part 340 is inserted into the slit part 330, and the winding guide part 340 is withdrawn from the slit part 330 in a state where the winding guide part 340 is moved to the left side of the slit part 330. Accordingly, as illustrated in FIG. 7, a uniform slack part 350 is formed on the input line and output line coil that is wound on the terminal pin. As the slack part 350 is formed, breaking of the coil that is caused by the thermal deformation or deterioration of the coil is minimized, and time required to wind the coil on the terminal pin is minimized to reduce the production cost and to improve productivity.

After the withdrawing of the winding guide part from the slit part (S4), the resolver is released from the winder. That is, if the resolver is released from the winder, the coil that is wound on the terminal pin that is formed on the terminal part of the insulation cover is wound on the terminal pin in a state where the tension is applied to the coil, and then is finally wound on the terminal pin having the slack part in a state where the winding guide part is withdrawn.

As described above, according to the method for winding a coil of an insulation cover of a resolver according to some example embodiments, the slack parts are formed on the coil that is wound on the terminal pins to relieve the tension that is applied to the coil through processes in which, in the case of winding the coil on the terminal pins of the terminal part that is formed on one side of the insulation cover, the winding guide parts, which are protrudingly formed on the winder to correspond to the slit parts so that the winding guide parts are inserted into or withdrawn from the slit parts that are formed on the body part to correspond to the terminal pins, are inserted into the right side of the slit parts and are withdrawn from the left side of the slit parts.

Accordingly, the breaking of the coil according to the thermal deformation or the deterioration of the coil is minimized, and the time and cost required to wind the coil on the terminal pins are reduced.

The presently disclosed technology can be applied to an insulation cover of a resolver and a method for winding a coil of the insulation cover, in which slack parts are formed on the coil through slit parts formed on a body part to correspond to terminal pins when the coil is wound on the terminal pins of a terminal part and winding guide parts protrudingly formed on a winder to correspond to the slit parts so that the guide parts are inserted into or withdrawn from the slit parts to minimize breaking of the coil according to thermal deformation or deterioration of the coil through relieving of the tension that is applied to the coil, to facilitate the manufacturing thereof through a compact structure, and to reduce the manufacturing cost.

Although example embodiments have been described for illustrative purposes, those skilled in the art will appreciate that various modifications, additions and substitutions are possible, without departing from the scope and spirit of the invention as disclosed in the accompanying claims.

The present invention is not limited to the embodiments as described above and the modified examples as illustrated in the drawing, and may be extended to other embodiments that belong to the scope of the appended claims.

Since those skilled in the art can embody the presently disclosed techniques without changing the technical idea or essential features, it should be understood that the above-described embodiments are exemplary in all aspects and are not to be construed as limiting the present invention. The description of the embodiments is intended to be illustrative, and not to limit the scope of the claims, and many alternatives, modifications, and variations will be apparent to those skilled in the art.

What is claimed is:

1. An insulation cover of a resolver configured to cover and insulate a stator of the resolver for sensing a rotation angle of a rotor that is rotated inside the stator composed of a stator core and a teeth part, comprising:
    a main body part;
    a teeth insulation part formed to be spaced apart from an inner circumferential surface of the main body part; and
    a terminal part formed on one side of the main body part, wherein the terminal part includes:
    a body part;
    a terminal pin protrudingly formed on an upper surface of the body part so that a coil is wound thereon;
    a slit part formed on the body part to correspond to the terminal pin; and
    a winding guide part configured to protrude from the slit part in a first state and be inserted into the slit part in a second state, the winding guide part disposed to be movable within the slit part along a horizontal direction.

2. The insulation cover of claim 1, wherein a plurality of terminal pins are formed in zigzag on the body part, and
    a plurality of slit parts are formed in zigzag on the body part to correspond to the terminal pins.

3. The insulation cover of claim 1, wherein the winding guide part has a left end coming in contact with a left end of the slit part in the first state.

4. The insulation cover of claim 1, wherein the winding guide part has a right end coming in contact with a right end of the slit part in the second state.

5. The insulation cover of claim 1, wherein the winding guide part has a smaller size than that of the slit part.

6. The insulation cover of claim 1, wherein a plurality of terminal pins are formed on a first horizontal line of the body part,
   a plurality of slit parts are formed on a second horizontal line of the body part, and
   the first horizontal line and the second horizontal line are spaced apart from each other for a predetermined distance.

7. The insulation cover of claim 6, wherein the respective terminal pins are formed so that left end parts thereof come in contact with a vertical line of the body part, and
   the respective slit parts are formed so that left end parts thereof are more inclined rightward against the vertical line than the left end parts of the terminal pins.

8. The insulation cover of claim 6, wherein the respective terminal pins are formed so that left end parts thereof come in contact with a vertical line of the body part, and
   the respective slit parts are formed so that left end parts thereof come in contact with the vertical line of the body part, and a width length of the slit part is longer than a width length of the terminal pin.

9. The insulation cover of claim 6, wherein the coil that is wound on the terminal pins after passing through right end parts of the winding guide parts that are inserted into the teeth parts and the slit parts is wound at a predetermined angle in order to form a slack part on the coil.

10. The insulation cover of claim 9, wherein the angle is equal to or larger than 90° and equal to or smaller than 180°.

\* \* \* \* \*